(12) United States Patent
Tatman

(10) Patent No.: US 8,693,350 B2
(45) Date of Patent: Apr. 8, 2014

(54) METHOD OF COLLECTING BGP ROUTING PROTOCOL MESSAGES

(75) Inventor: Lance Tatman, Fremont, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 2170 days.

(21) Appl. No.: 10/973,203

(22) Filed: Oct. 26, 2004

(65) Prior Publication Data

US 2006/0087977 A1    Apr. 27, 2006

(51) Int. Cl.
*G01R 31/08* (2006.01)

(52) U.S. Cl.
USPC .......................... 370/242; 370/229; 370/252

(58) Field of Classification Search
USPC .................. 370/229, 254, 242, 248, 252, 400
See application file for complete search history.

(56) References Cited

U.S. PATENT DOCUMENTS

| | | | |
|---|---|---|---|
| 6,173,324 B1 * | 1/2001 | D'Souza | 709/224 |
| 7,236,453 B2 * | 6/2007 | Visser et al. | 370/219 |
| 7,392,424 B2 * | 6/2008 | Ho et al. | 714/4 |
| 2005/0018602 A1 * | 1/2005 | Labovitz | 370/229 |
| 2005/0177634 A1 * | 8/2005 | Scudder et al. | 709/225 |
| 2006/0062142 A1 * | 3/2006 | Appanna et al. | 370/219 |
| 2006/0171404 A1 * | 8/2006 | Nalawade et al. | 370/401 |

OTHER PUBLICATIONS

Y. Rekhter, T. J. Watson Research Center, IBM Corp. and T. Li, Cisco Systems, Editors, Mar. 1995—"A Border Gateway Protocol 4 (BGP-4)"; pp. 1-57.

* cited by examiner

*Primary Examiner* — Kwang B Yao
*Assistant Examiner* — Nguyen Ngo
(74) *Attorney, Agent, or Firm* — Volentine & Whitt, PLLC

(57) ABSTRACT

BGP Route Recorder (BRR) captures and dumps Border Gateway Protocol (BGP) messages received from BGP peers. Passive links are established between the BRR and BGP peers. All incoming and outgoing BGP messages are recorded and timestamped. Rather than tear down BGP peering sessions when errors are encountered, error conditions are recorded, and the BRR may be configured to maintain links across selected BGP errors.

15 Claims, 2 Drawing Sheets

… … …

METHOD OF COLLECTING BGP ROUTING PROTOCOL MESSAGES

TECHNICAL FIELD

Embodiments in accordance with the invention relate generally to switched packet networks, and more particularly, to collecting and recording Border Gateway Protocol (BGP) routing protocol messages in a switched Internet Protocol (IP) network.

BACKGROUND

Packet switched digital networks are the backbone of the Internet. In a packet switched Internet Protocol (IP) network, digital information flowing from a source to a destination is broken up into a sequence of packets. These packets are routed through the network through a myriad of routers and switches. There is no guarantee that packets will all follow the same route. Routing, and route management, controls the routes packets follow, and how those routes change, adapt, and respond to network conditions such as loading and failures.

Packet traffic is switched between routers. A router is a computer networking device combining hardware and software to forward data packets toward their destination. A router connects to other routers, which, when using Border Gateway Protocol (BGP), are known as peers. This initial peering is generally established by manual configuration. Each router maintains a table of networks or prefixes which designate network reachability. Peered routers manage these tables by exchanging messages according to the Border Gateway Protocol (BGP), specified in RFC 1771.

Route Management is an area of active research in the Internet community as well as an area of interest to Network Service Providers (NSPs). By monitoring and managing routing, one can track problems missed by traditional network element and service monitoring and at the same time, gather information useful when evaluating peering. In order to conduct meaningful routing management as it pertains to Boarder Gateway Routing (BGP) protocol, it is necessary to collect individual routing updates from peer routers.

Software tools to record routing information are available from at least two sources. The first is Zebra or Quagga, which is a fully functional routing protocol suite, which happens to have the capability to record routing updates. Mrtd, part of the MRT package from the University of Michigan is also capable of recording routing updates. Both of these tools have their problems when used as a network instrument. First, they are built to do much more than is necessary to simply record routes. Both tools are capable of full BGP routing functionality and primarily because of this added processing, do not scale well. Second, the behavior of these tools interferes with the measurements they are trying to record. Both of the above mentioned tools will tear down the BGP peering session when they receive any error from the peer, in conformance to the BGP specification.

SUMMARY

In accordance with the invention, a Border Gateway Protocol (BGP) Route Recorder (BRR) records and timestamps all incoming and outgoing BGP messages. Peering sessions may be preserved across errors, and the BRR is allowed only to passively listen for peering session initialization.

BRIEF DESCRIPTION OF THE DRAWINGS

The invention will best be understood by reference to the following detailed description of embodiments in accordance with the invention when read in conjunction with the accompanying drawings, wherein.

DETAILED DESCRIPTION

Figure 1:
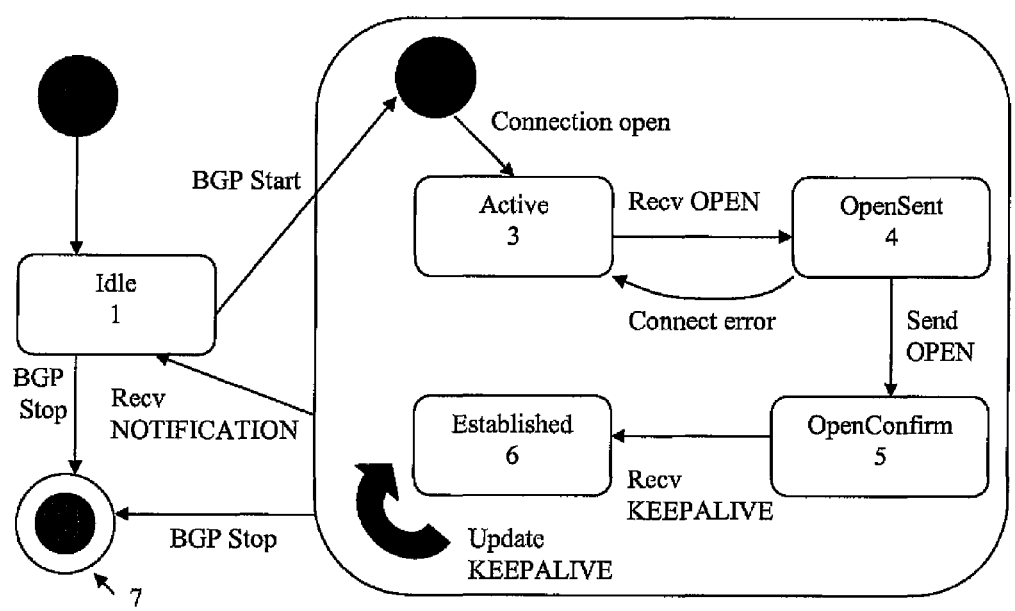
FIG. 1 shows a finite state machine for use in embodiments of the present invention.

The invention relates to recording of Border Gateway Protocol (BGP) messages in a packet-switched IP network. The following description is presented to enable one skilled in the art to make and use the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments show but is to be accorded the widest scope consistent with the appended claims and with the principles and features described herein.

The operation of BGP routers is defined in RFC 1771. The current revision of RFC 1771 is BGP-4, published March 1995, incorporated herein by reference and referred to as RFC 1771.

Under RFC 1771, two peers form a connection between one another. They exchange BGP messages to open and confirm the connection parameters between them. Depending on the individual router configuration, the initial data flow is the entire BGP routing table. Incremental periodic updates are sent as the routing tables change. BGP does not require periodic refresh of the entire BGP routing table. Therefore, a BGP system must retain an aggregate view of all BGP routing tables sent by each peer as well as track the table version number from each peer for the duration of the connection. KeepAlive messages are sent periodically to ensure the liveness of the connection. Notification messages are sent in response to errors or special conditions. If a connection encounters an error condition, a notification message is sent and the connection is closed.

It should be noted that under RFC 1771, the connection between peers is closed if a connection encounters an error condition. When the connection is opened for the first time, or reopened recovering from an error, according to RFC 1771, the entire BGP routing table destined for that peer is sent. Such errors include failure to respond in a timely fashion to a KeepAlive message, message header errors (Type 1), update errors (Type 3), hold timer expired errors (Type 4), and finite state machine errors (Type 5).

Existing routing suites such as Zebra and Mrtd have the capability to record some but not all BGP traffic. Because this recording capability has been added onto existing programs which have full BGP routing functionality, they introduce noise and errors into recorded BGP traffic.

Embodiments of the present invention provide a BGP Route Recorder (BRR) which records all BGP messages from peers. The BRR according to the present invention does not originate BGP updates, but records BGP messages from peered systems as well as its own KeepAlive, Notification, and Close messages. Of particular significance is that the BRR will record a Notification message that it would send, but does not actually send the Notification message. The Notification message contains the reason an error occurred. So, BRR behavior upon receipt of an Update error, for instance, would be to record the original Update message as it was received, and record a Notification message of the correct type according to the error, in this case, a Type 3 error, but BRR would never send the Notification nor would it tear the session down. This behavior is configurable, as a continuous recurrence of an error condition without an escape is also a dangerous condition, so in one embodiment, the number of times an error can be received before a Notification message is actually sent and the session is torn down, is configurable by the user.

In an embodiment of the present invention, BGP messages are time stamped as early as possible, preferably at the socket level of the network communications stack. In systems such as Zebra and Mrtd, time stamping occurs at the point in time when a message is to be written to disk, which can be many minutes after they were received.

The primary function of systems such as Zebra and Mrtd are to be routers; BGP recording is an addition. When routing operations and routing traffic occupy a significant portion of system capacity, BGP messages may not be recorded. Indeed, a known issue with systems such as Zebra and Mrtd is that, under heavy load, they may fail to generate BGP KeepAlive messages with peers, resulting in the session with that peer being reset and torn down. The session is then automatically re-established, and the full table for that peer re-transmitted. This not only introduces noise when attempting to measure BGP protocol activity, but it also can cause a cascade of failures as the device adds load by resetting sessions and receiving full routing updates for each, exacerbating the load on the recording device. Since current methods use programs which implement full routing suites, these programs must maintain and make routing decisions on each route as it is received. Implementations of the present invention provide a purpose built measurement instrument which only timestamp and record routing messages, and has no need to use routing algorithms or maintain routing tables; this provides a significant improvement in performance and a significant savings in hardware requirements. Additionally, when a router such as Zebra or Mrtd receives an erroneous message, or reports an error to its peers, these BGP messages are not recorded, or are recorded with null fields. Not recording messages, particularly those which indicate or result in errors, is anathema to instrumentation and measurement. A BRR according to the present invention captures all BGP messages, including those which signal or result in errors.

According to RFC 1771, when a site starts up, it attempts to open BGP sessions with all configured peers. As each session is opened, BGP routing tables are exchanged with peers. With a large number of peers, this may represent a considerable amount of traffic. A BRR according to the present invention exhibits behavior which deviates from that specified in RFC 1771. A BRR according to the present invention starts up in passive mode, listening to and recording traffic, but waiting for peers to open a BGP session.

FIG. 1 shows a finite state machine suitable for use in embodiments of the present invention. In operation, one instance of the state machine exists for each peered connection.

Each instance of the state machine, representing a peered connection, has associated with it a current state. All state machines begin in Idle state 1. The finite state machine shown in FIG. 1 has six states:

| 1 | Idle |
| 2 | Connect (unused) |

-continued

| 3 | Active |
| 4 | OpenSent |
| 5 | OpenConfirm |
| 6 | Established |

Exit processing at the end of a recording session is shown as 7 in FIG. 1. Associated with each state is a set of events and transition tables. A set of states, events, and transition tables suitable for the finite state machine shown in FIG. 1 is attached as Appendix 1. Note that while the states and events are the same as described in RFC 1771, the transition tables used by the present invention differ from those in the RFC.

The set of events associated with the finite state machine of FIG. 1 is:

| 1 | BGP Start |
| 2 | BGP Stop |
| 3 | BGP Transport Connection open |
| 4 | BGP Transport Connection Closed |
| 5 | BGP Transport Connection Open Failed |
| 6 | BGP Transport Fatal Error |
| 7 | ConnectionRetry Timed Expired |
| 8 | Hold Timer Expired |
| 9 | KeepAlive Timer Expired |
| 10 | Receive Open message |
| 11 | Receive KeepAlive Message |
| 12 | Receive Update message |
| 13 | Receive Notification message |

In each state, the associated transition table of Appendix 1 specifies which events transition to which states, and also details other processing which occurs as events are handled. All BGP messages, incoming and outgoing, are recorded, as are notifications. As is common in the implementation of finite state machines, not all events may be allowed in every state. In routers compliant with RFC 1771, errors and/or forbidden transitions result in the BGP peering session being terminated. In a BGP Route Recorder (BRR) according to the present invention, such errors are logged. A BRR according to the present invention may be configured to maintain links with BGP peers when errors occur.

All peered connections, and therefore the state machine for each peered connection, starts in Idle state 1. The BGP Start event transitions the state machine to Active state 3. The state machine remains in Idle state 1 for any other event.

Connection state 2 is not used by the BRR according to the present invention, but is used by BGP routers conforming to RFC 1771.

In Active state 3, receipt of a BGP start event remains in Active state 3. Receipt of a BGP stop event transitions to Idle state 1. Receipt of a BGP Transport Connection Open event begins the open process, and transitions to OpenSent state 4. Receipt of a BGP Transport Connection Open Failed event remains in Active state 3. All other events transition to Idle state 1.

OpenSent state 4 is the next part of the process of establishing a full BGP peering session. Receipt of a BGP start event remains in OpenSent state 4. Receipt of a BGP Stop event transitions to Idle state 1 after notification and cleanup. Receipt of BGP Transport Connection Closed, Connection Open Failed, or Fatal Error events transition to Active state 3. Receipt of Hold or KeepAlive Timer Expired events remain in OpenSent state 4. Receipt of the Open event either transitions to OpenConfirm state 5 sending Open and KeepAlive messages, and starting keep-alive and hold timers, or to Idle state 1 after error notification. Receipt of other events produce notifications and transition to Idle state 1.

OpenConfirm state 5 continues processing the BGP peering session. Receipt of BGP Start, Hold Timer Expired, KeepAlive Timer Expired, or Update events remain in OpenConfirm state 5, with the additional actions as shown in Appendix 1. Receipt of BGP Stop causes notification and clean-up actions as indicated, transitioning to Idle state 1. Receipt of Hold Timer Expired events notifies and restarts the hold timer, remaining in OpenConfirm state 5. Receipt of KeepAlive timer expired events restarts the KeepAlive timer, sends a KeepAlive message to the BGP peer, and remains in OpenConfirm state 5. When a KeepAlive event is received, the hold timer is restarted, transitioning to Established state 6.

Established state 6 represents an established BGP peering session. Receipt of BGP Stop or Notification events causes notification, cleanup, and transition to Idle state 1. Receipt of other events remain in Established state 6 with processing as indicated.

Figure 2:
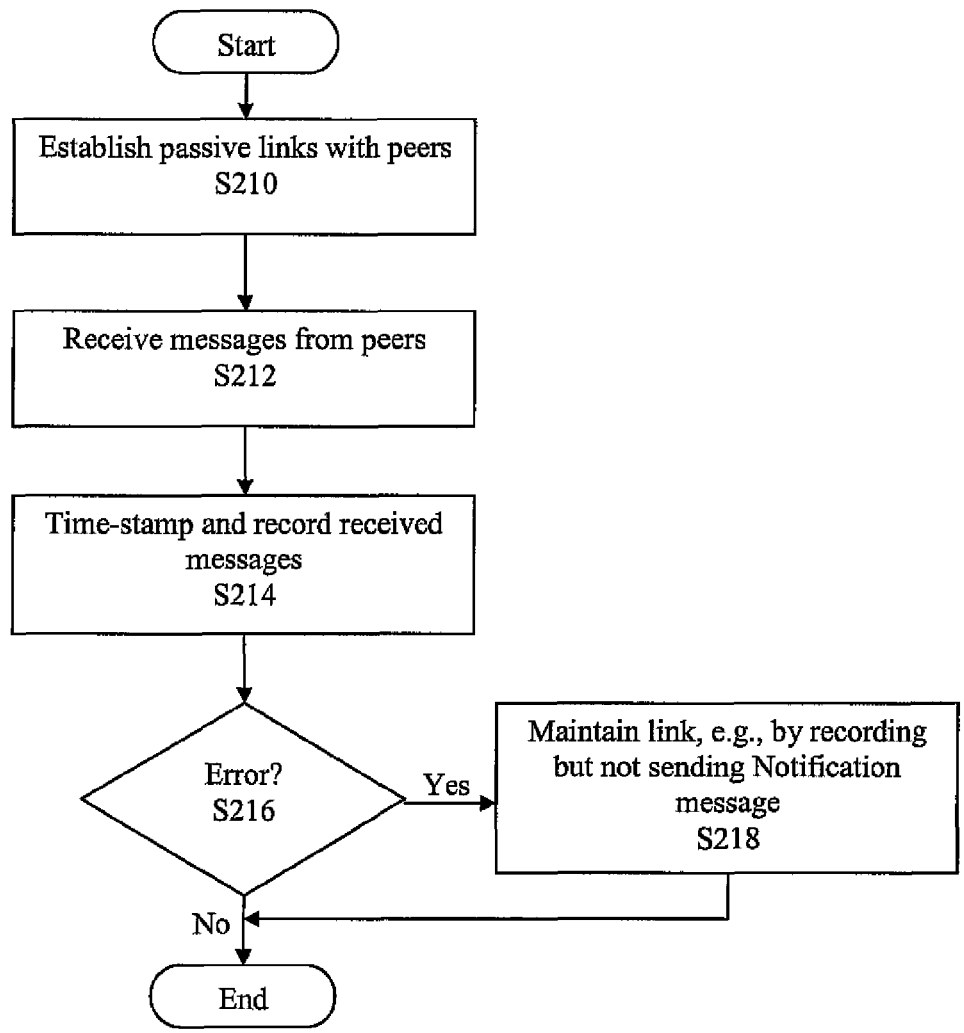

FIG. 2 is a flow diagram showing a method of recording BGP messages from BGP peers, according to embodiments of the present invention. In step S210, passive links are established with peer devices, in order to listen to and record traffic, for example. Messages are received from the peer devices in step S212, which messages are time-stamped and recorded in step S214. In step S216, it is determined whether a BGP error has occurred. When an error has occurred, the links are maintained with the BGP peers across the error, which includes recording, but not sending, Notification message(s) in response to the error at step S218. The Notification message may contain the reason the error has occurred. When there is no error, the error related Notification message is not recorded.

The foregoing detailed description of the present invention is provided for the purpose of illustration and is not intended to be exhaustive or to limit the invention to the precise embodiments disclosed. Accordingly the scope of the present invention is defined by the appended claims.

The invention claimed is:

1. A method of recording Border Gateway Protocol (BGP) messages from BGP peers, the method comprising:
    establishing a passive link with at least one BGP peer to receive BGP messages from the at least one BGP peer;
    time-stamping and recording the received BGP messages upon arrival; and
    maintaining the link with the at least one BGP peer across a selected BGP error, wherein maintaining the link comprises recording, but not sending, a notification message in response to the selected BGP error.

2. The method of claim 1, wherein maintaining links with the at least one BGP peer across selected BGP errors is configurable with respect to the selected BGP errors.

3. The method of claim 1, further comprising:
    time-stamping and recording outgoing BGP messages.

4. The method of claim 1, wherein the selected BGP errors comprise message header errors.

5. The method of claim 1, wherein the selected BGP errors comprise update errors.

6. The method of claim 1, wherein the selected BGP errors comprise hold timer expired errors.

7. The method of claim 1, wherein the selected BGP errors comprise finite machine errors.

8. A Border Gateway Protocol (BGP) Route Recorder (BRR) for recording BGP messages from BGP peers, comprising:
    means for establishing passive links with the BGP peers, including awaiting the BGP peers to open BGP sessions;
    means for receiving BGP messages from the BGP peers;
    means for time-stamping and recording all BGP messages from the BGP peers upon arrival; and
    means for maintaining the links with the BGP peers across selected BGP errors, wherein maintaining the links comprises recording, but not sending notification messages in response to the selected BGP errors.

9. The BRR of claim 8, wherein the BRR does not make routing decisions with respect to the received BGP messages from the BGP peer.

10. The BRR of claim 8, wherein maintaining links with the BGP peer across selected BGP errors is configurable with respect to the selected BGP errors, to prevent continuous recurrence of the selected BGP errors.

11. A non-transitory computer readable medium that includes executable instructions for processing Border Gateway Protocol (BGP) message traffic in a BGP Route Recorder (BRR), said computer readable medium comprising:
    code for listening in a passive mode for BGP peers and awaiting the BPG peers to open BGP sessions to establish links between the BRR and BGP peers;
    code for receiving BGP messages from the BGP peers;
    code for time-stamping and recording all BFP messages from the BGP peers upon message arrival; and
    code for maintaining the links with the BGP peers across selected BGP errors, wherein maintaining the links comprises recording, but not sending, notification messages in response to the selected BGP errors.

12. The computer readable medium of claim 11, wherein the selected BGP errors comprise message header errors.

13. The computer readable medium of claim 11, wherein the selected BGP errors comprise update errors.

14. The computer readable medium of claim 11, wherein the selected BGP errors comprise hold timer expired errors.

15. The computer readable medium of claim 11, wherein the selected BGP errors comprise finite machine errors.

* * * * *